April 10, 1928.

A. M. CRAIG 1,665,909

GEAR SHIFT

Filed April 24, 1923

INVENTOR
Alvin M. Craig

BY
W. B. Hutchinson,
ATTORNEY

April 10, 1928.  1,665,909
A. M. CRAIG
GEAR SHIFT
Filed April 24, 1923   10 Sheets-Sheet 4
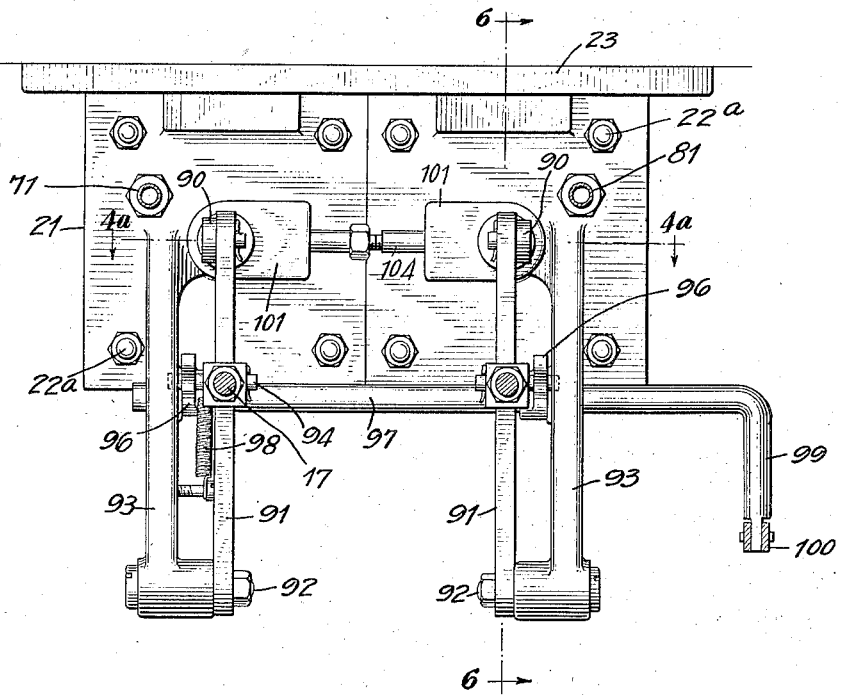
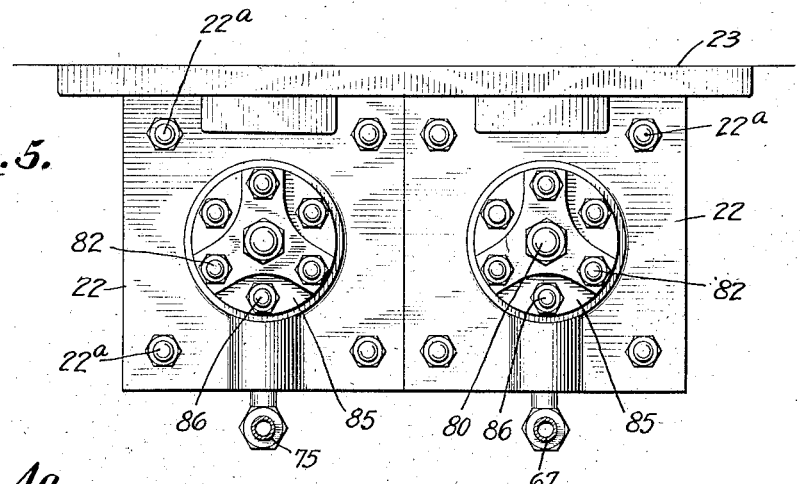
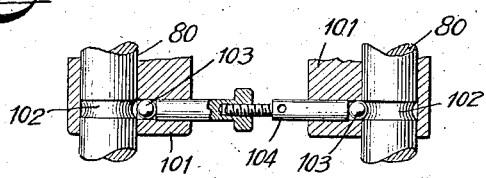
INVENTOR
Alvin M. Craig
BY
W. B. Hutchinson,
ATTORNEY April 10, 1928.

A. M. CRAIG

GEAR SHIFT

Filed April 24, 1923

INVENTOR
Alvin M. Craig

BY
W. B. Hutchinson.
ATTORNEY

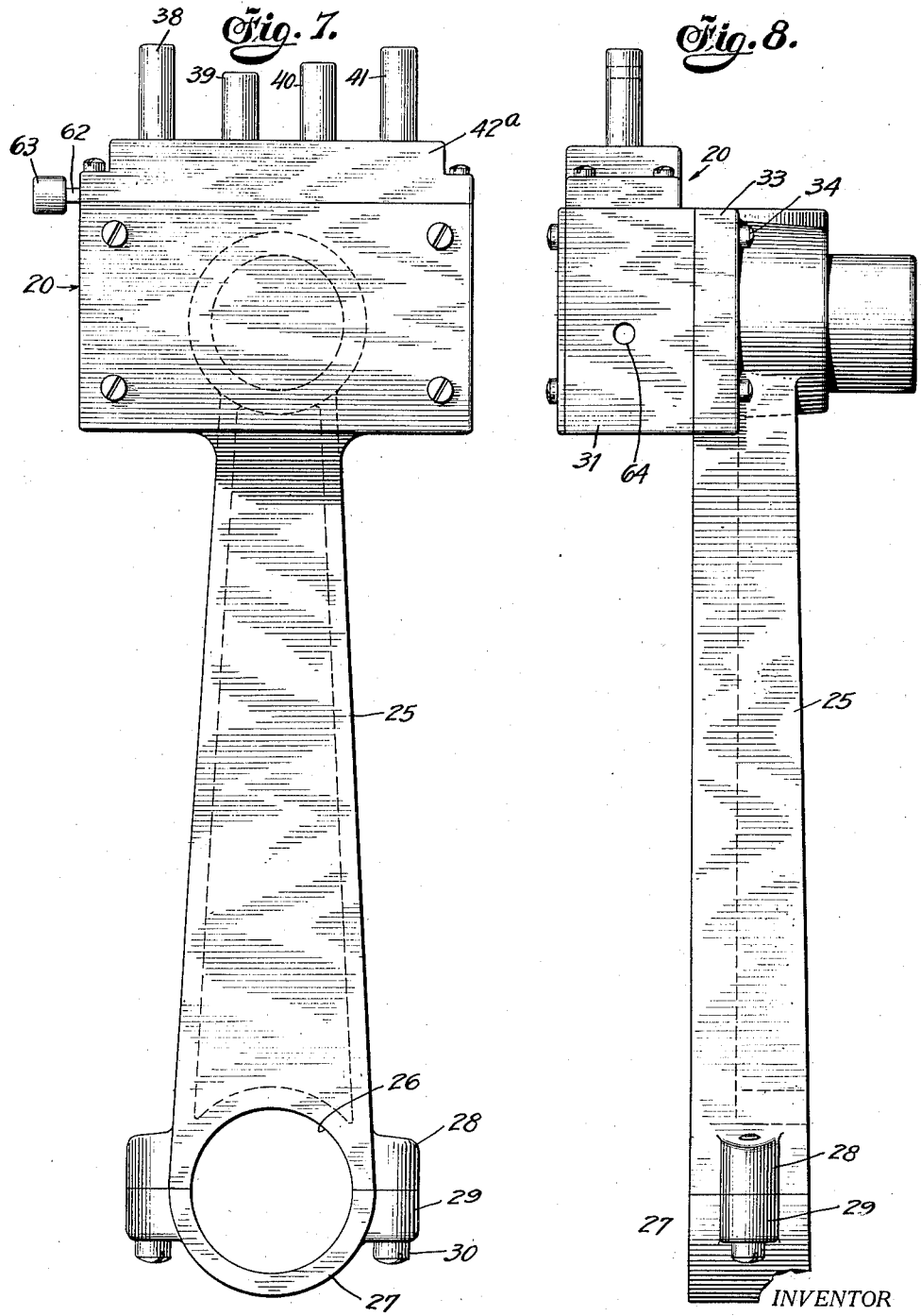

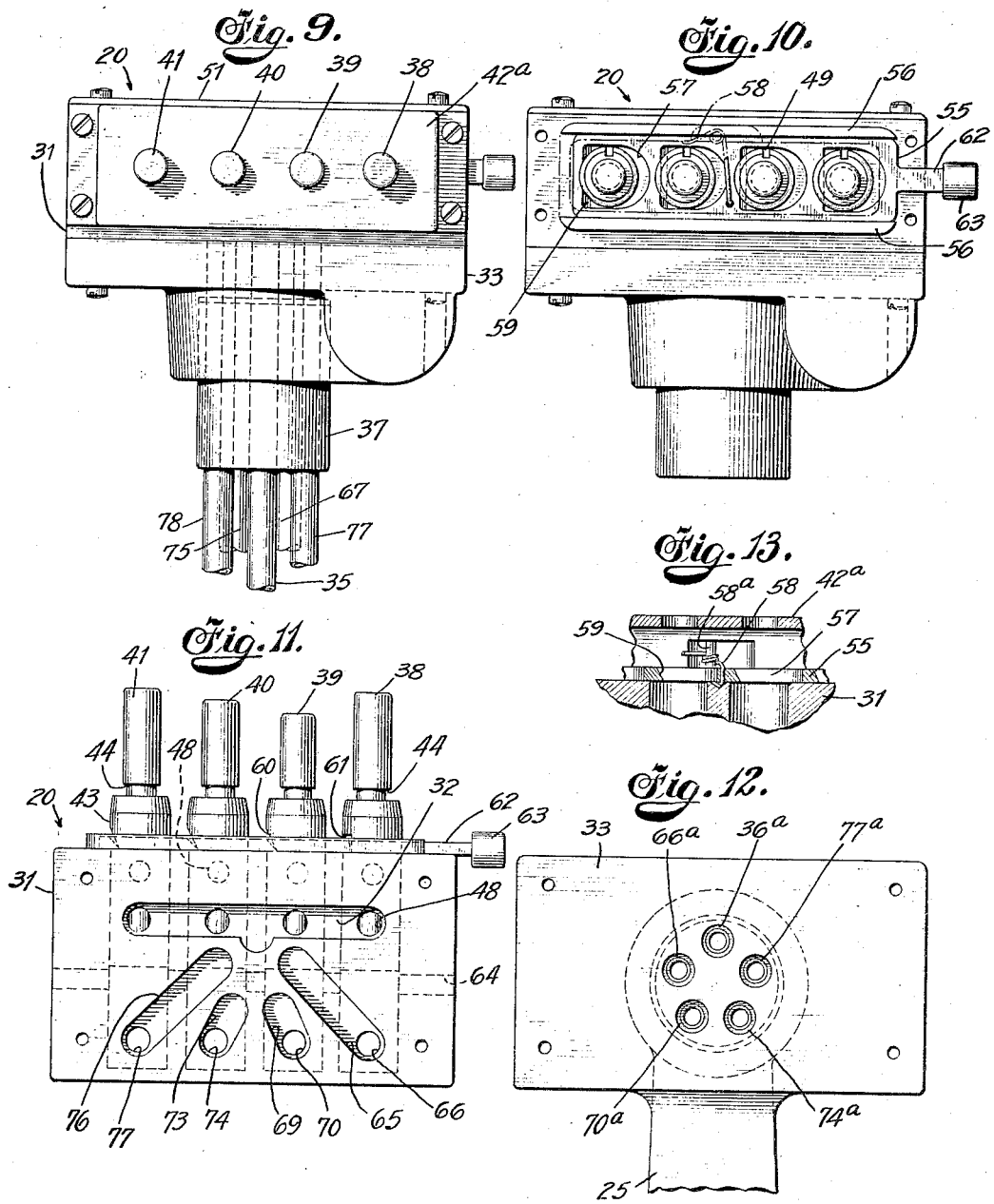

April 10, 1928.
A. M. CRAIG
1,665,909
GEAR SHIFT
Filed April 24, 1923 10 Sheets-Sheet 8
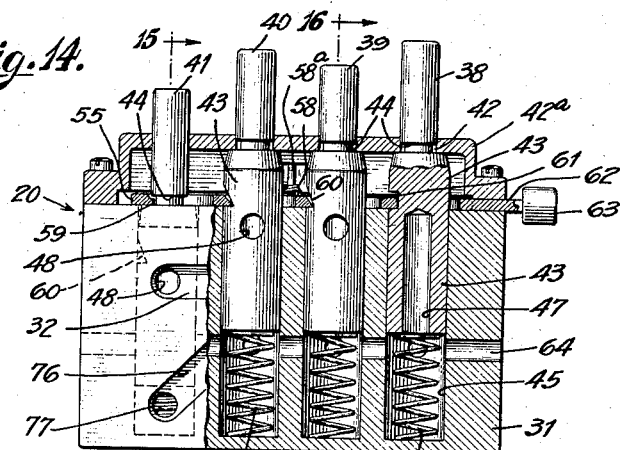
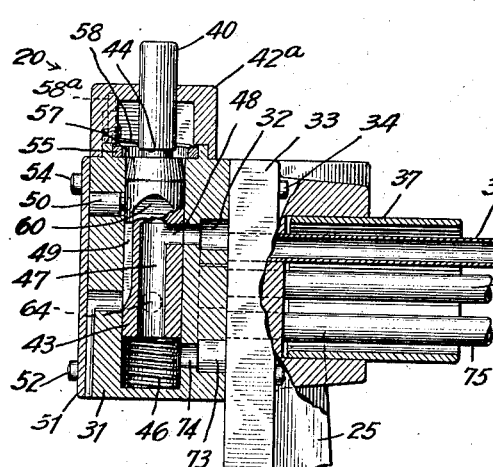
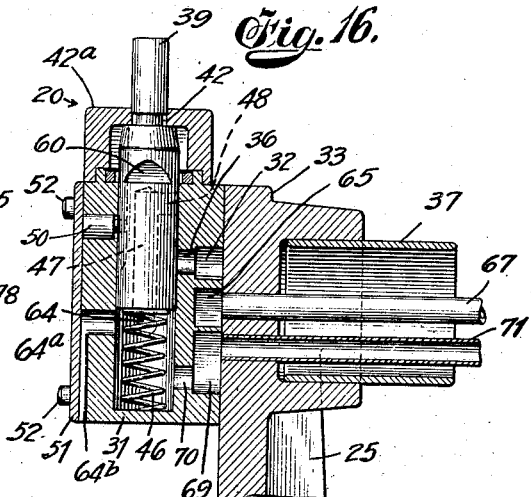
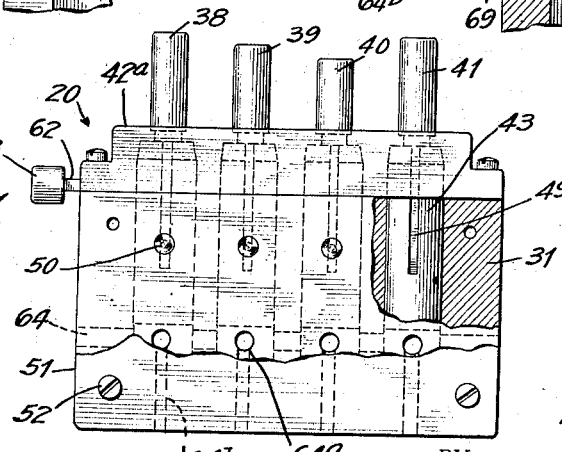
INVENTOR
Alvin M. Craig
BY
W. B. Hutchinson,
ATTORNEY

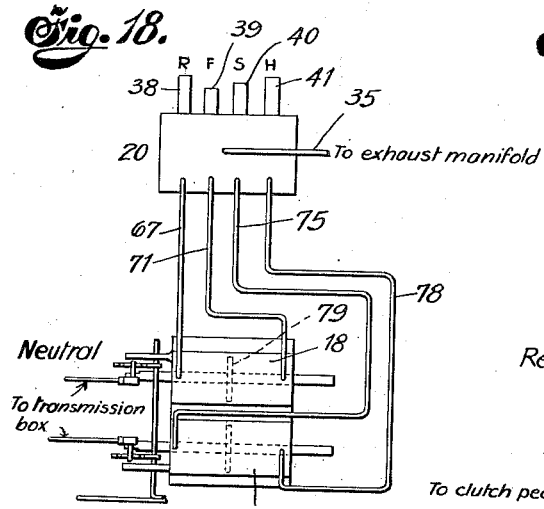
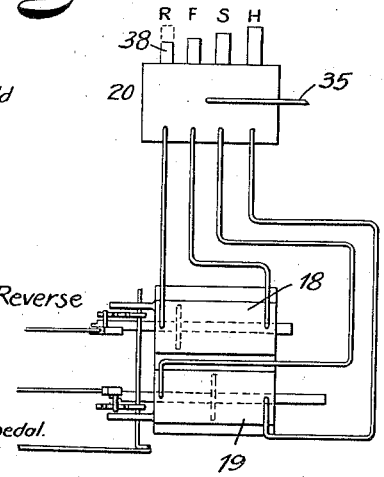
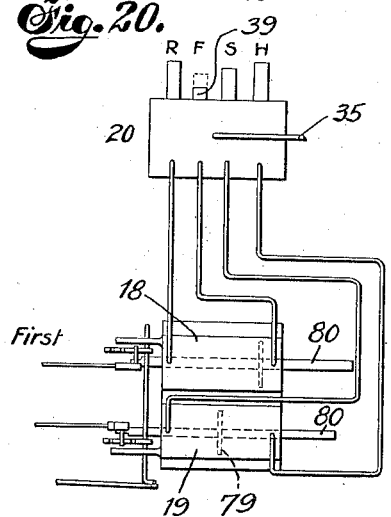
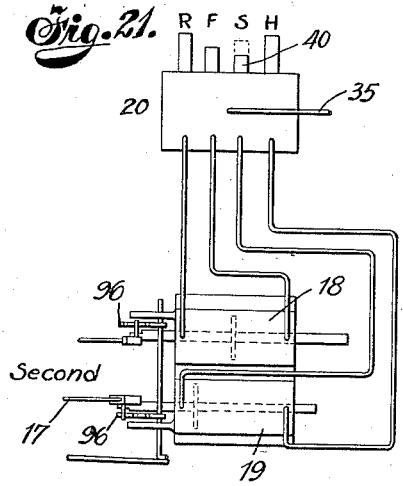
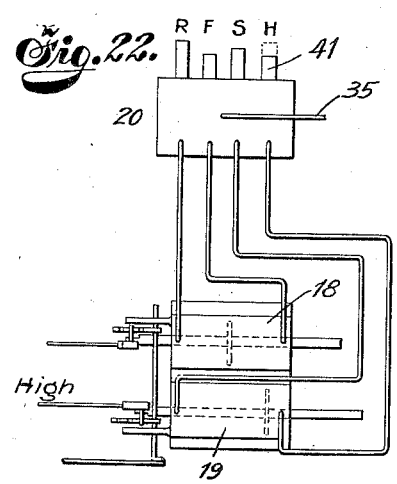

April 10, 1928.

A. M. CRAIG 1,665,909

GEAR SHIFT

Filed April 24, 1923

Inventor
Alvin M. Craig
By his Attorney
W. B. Hutchinson.

Patented Apr. 10, 1928.

1,665,909

UNITED STATES PATENT OFFICE.

ALVIN M. CRAIG, OF NEW HAVEN, CONNECTICUT, ASSIGNOR TO UNIVERSAL GEAR SHIFT CORPORATION, OF NEW YORK, N. Y., A CORPORATION OF DELAWARE.

GEAR SHIFT.

Application filed April 24, 1923. Serial No. 634,397.

My invention relates to improvements in pneumatic gear shifts for automobiles and the like, in which fluid pressure, usually a vacuum on one side of a piston, and air pressure on the other, is utilized to actuate the gear shift rods and change the gears. My invention is intended to improve constructions of this kind, and produce a positive and absolutely reliable structure which can be easily applied to standard cars, either in course of construction, or to those already in existence.

My invention is intended to produce a device which can be preferably actuated by connecting the cylinders with a means of creating a vacuum, preferably a manifold or the suction side of an engine, and in connection therewith to produce a button box or valve casing which is located within easy reach of the operator, and by which the vacuum is controlled so that if the engine is in operation, the vacuum can be directed to the desired cylinder and to the desired side of the piston, causing the same to actuate the gear shift rod common to practically all cars. It is important to have the button box arranged within easy reach of the operator, and I support it on the steering post near the steering wheel so that the desired button can be pressed, and thus the desired gear shifted so as to change the speed from first to second, or third or reverse, as desired.

The invention is also intended to construct the controlling mechanism and arrange the parts so that confusion is avoided, and it is impossible to operate more than one valve at a time, or to cause any confusion in the shifting mechanism. The invention is also intended to provide an additional safeguard so that besides the button box control, a positive lock is used which automatically locks the piston not in use, and thus confusion in the transmission box is avoided.

The invention is intended to operate also in connection with the customary clutch pedal which is used to throw the device into neutral position, and it is intended to produce a structure which cannot get out of order, and which has the parts arranged so that there is practically no danger of leakage.

In general, my invention is intended to produce an efficient pneumatic gear shift preferably operating by a vacuum, and under perfect control, to the end that the usual gear shift lever can be dispensed with, stripping of gears obviated, and a better construction substituted for those generally used. All of which will be better understood from the description which follows.

Reference is to be had to the accompanying drawings forming a part of this specification, in which similar reference characters indicate corresponding parts in all the views.

Figure 4 is a rear end view of the cylinders and connected parts with the shift rods in section.

Figure 4$^a$ is a detail of the automatic lock for the piston rods and pistons, on the line 4$^a$—4$^a$ of Figure 4.

Figure 5 is a front end view of the operating cylinders.

Figure 6:
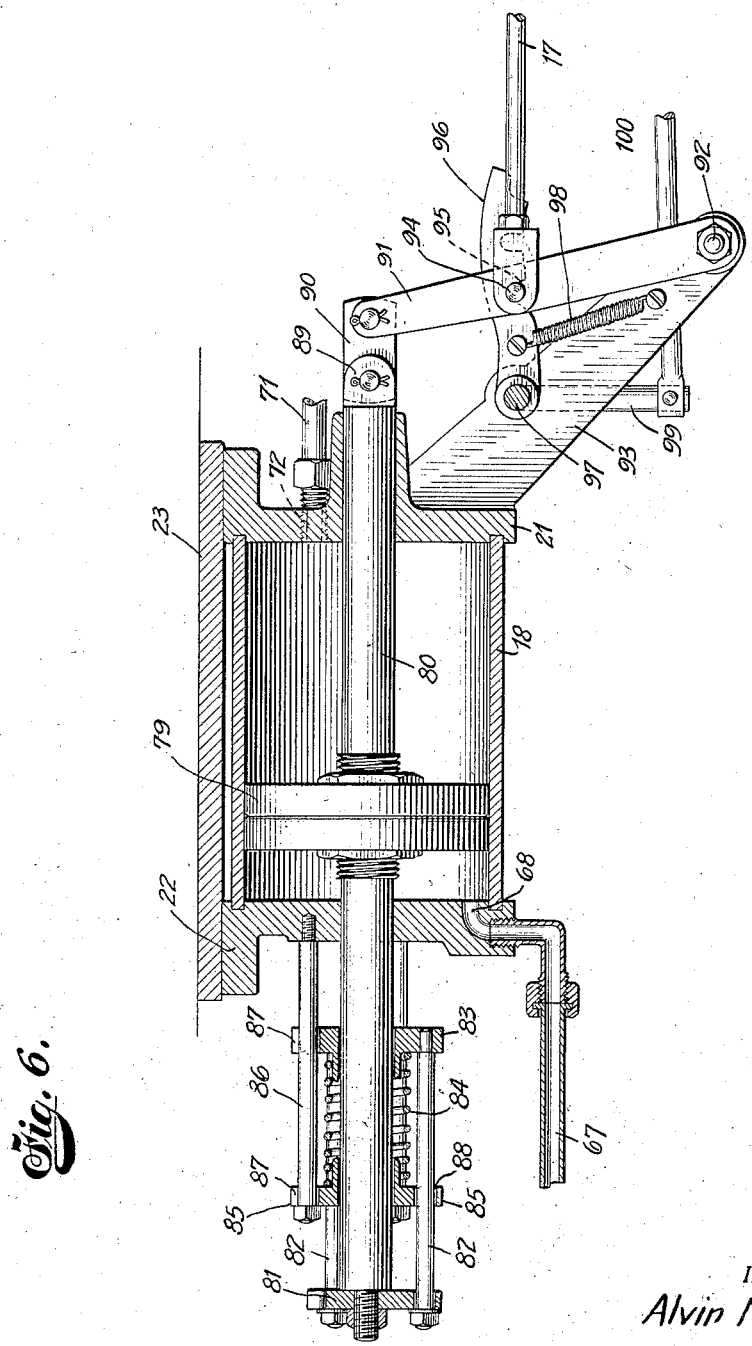

Figure 6 is a longtiudinal vertical section through one of the cylinders.

Figure 7 is a detail plan of the button box and its supporting arm.

Figure 8 is a side elevation of the construction shown in Figure 7.

Figure 9 is a front elevation of the button box showing the connecting vacuum pipes, these being broken away in part.

Figure 10 is a view similar to Figure 9, but with the cap removed.

Figure 11 is a plan of the button box with the cover plate removed.

Figure 12 is an inside detail of the cover plate for the button box.

Figure 13 is a detail section showing the locking plate for the button box valve.

Figure 14 is a broken sectional plan of the button box.

Figure 15 is a section on the line 15—15 of Figure 14.

Figure 16 is a section on the line 16—16 of Figure 14.

Figure 17 is a broken plan partly in section of the button box.

Figure 18 is a diagram showing the position of the operating pistons when the shift mechanism is in neutral.

Figure 19 is a similar view showing the position of the pistons and valve control when the gears are set for reverse.

Figure 20 shows the arrangement when set for first speed,

Figure 21 when set for second speed.

Figure 22 when set for high speed.

Figure 23:
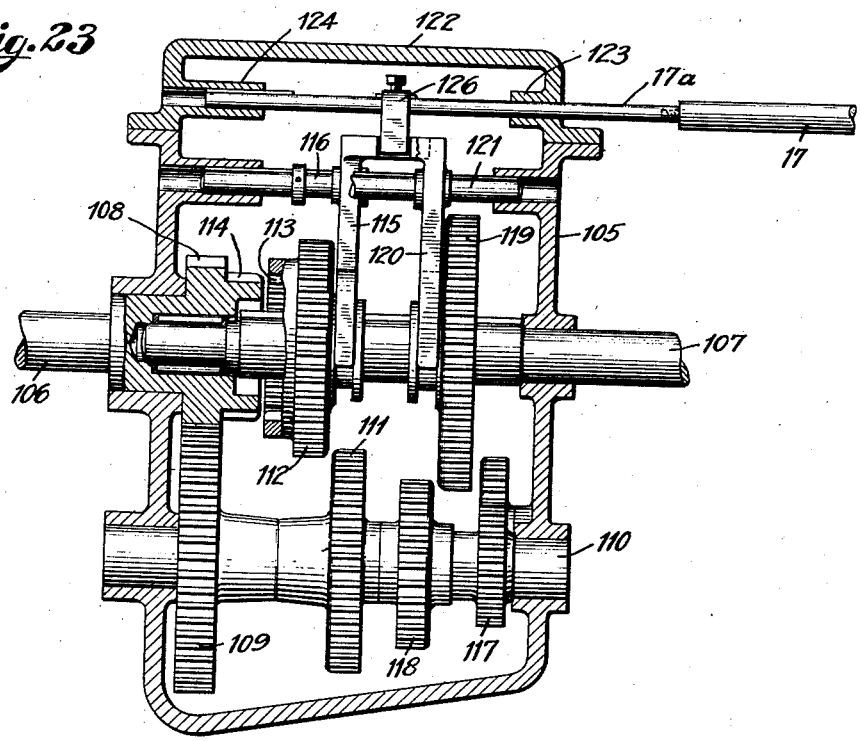
Figure 24:
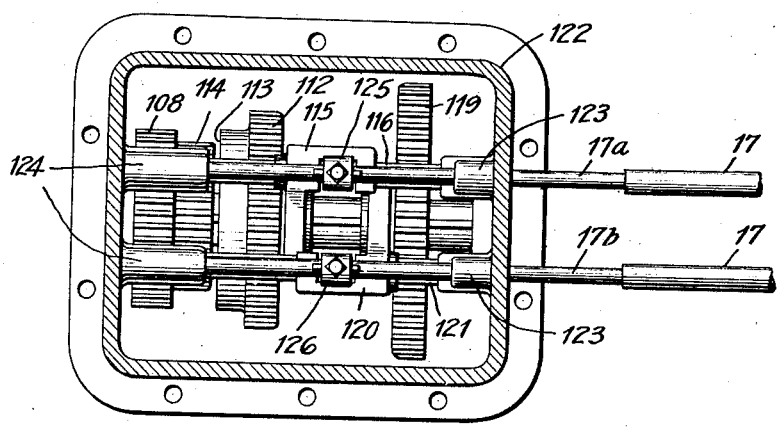

Figure 23 is a broken sectional elevation of a standard transmission gear showing how my gear shifting rods connect with it, and Figure 24 is a sectional plan of the structure shown in Figure 23.

Figure 1:
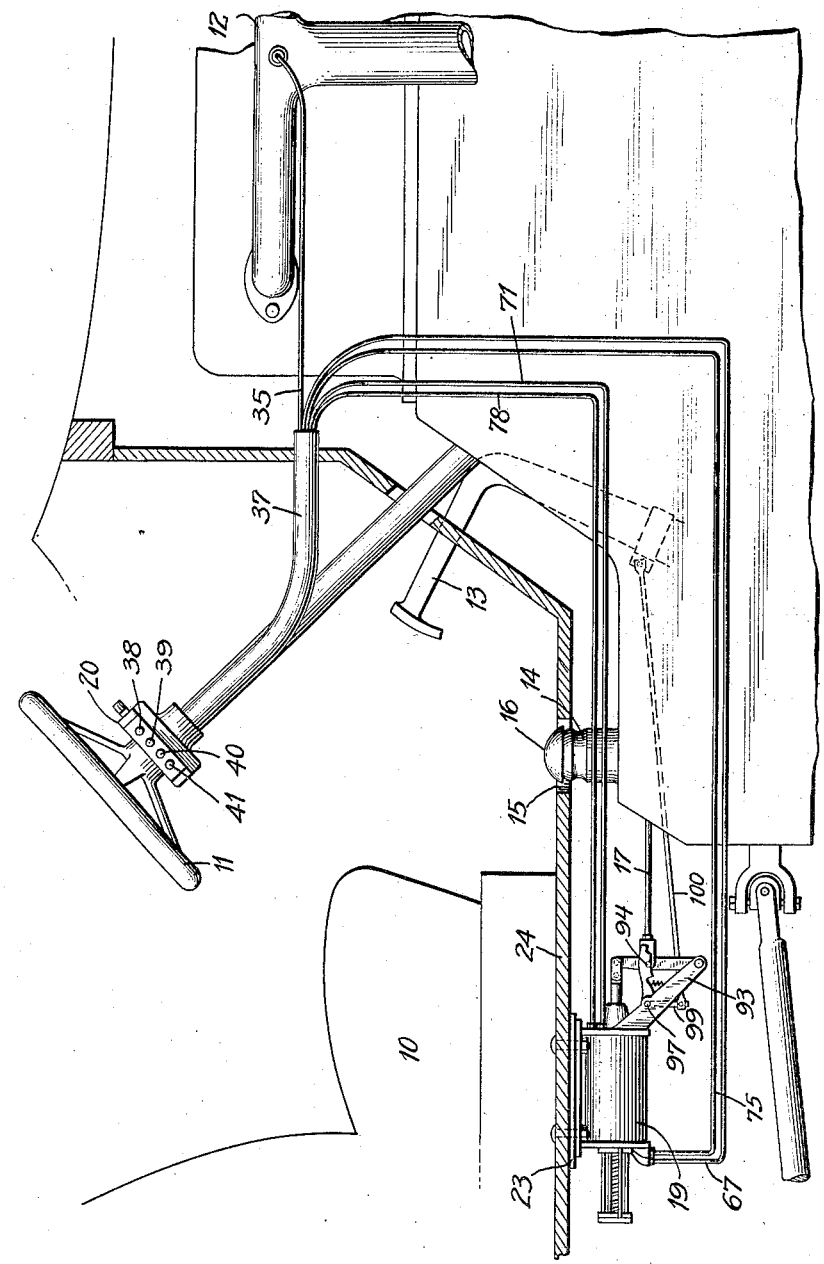
Figure 1 is a broken elevation partly in section showing the application of my improvements to a car.
Figure 2:
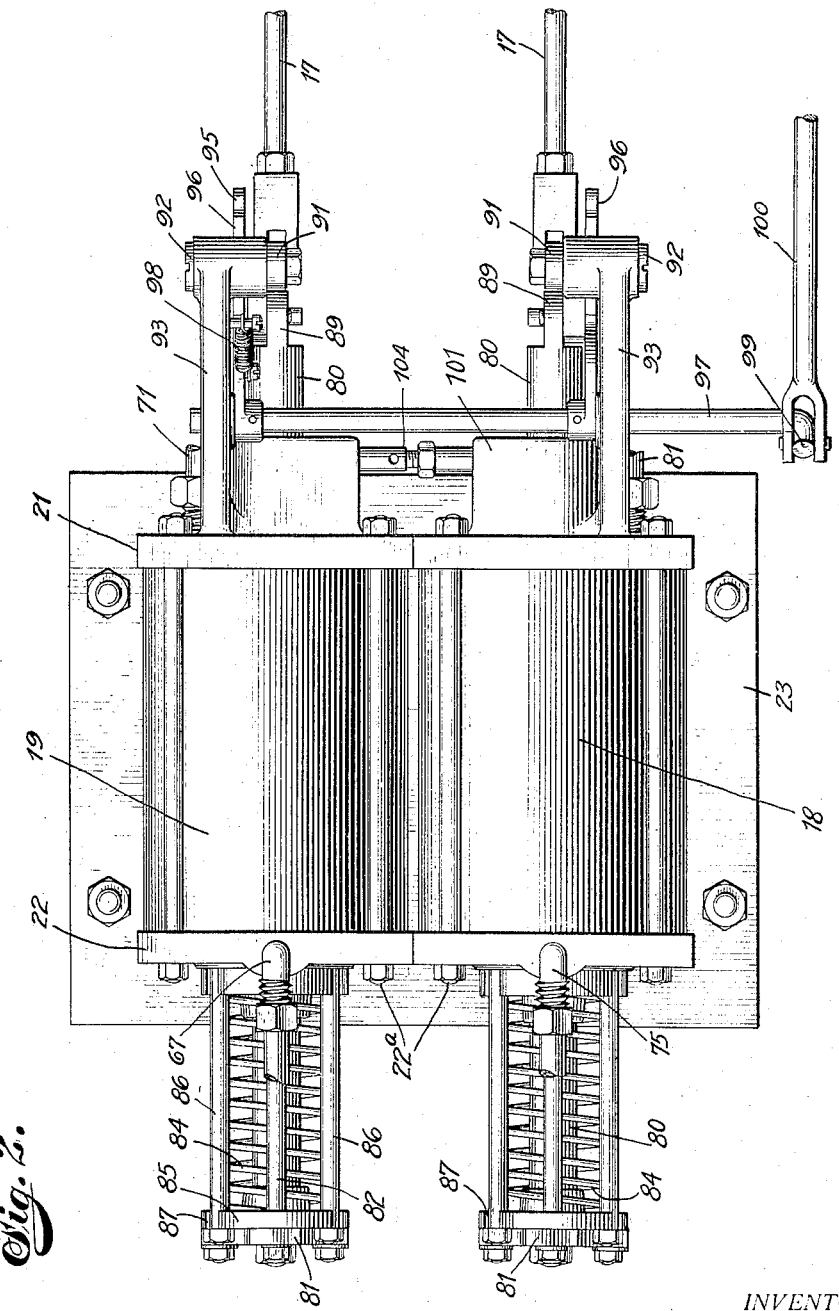
Figure 2 is an enlarged bottom or inverted plan view of the operating cylinders and their connecting mechanism.
Figure 3:
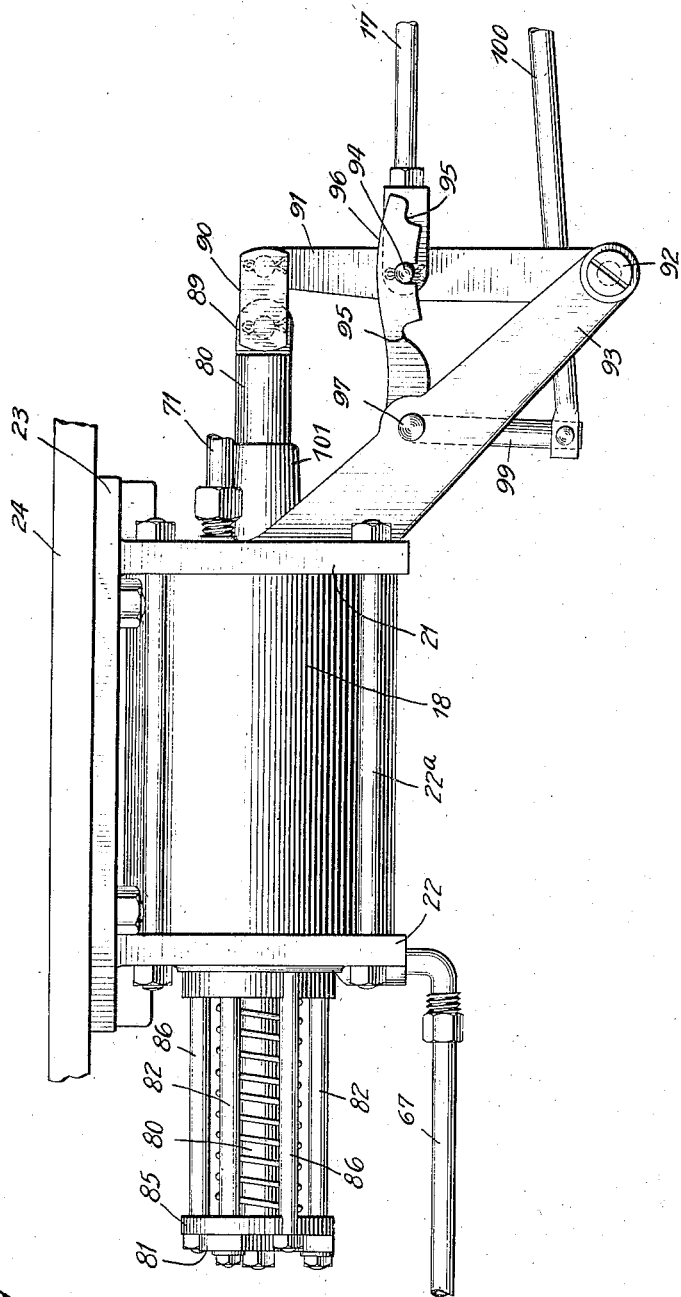
Figure 3 is a side elevation of the structure shown in Figure 2.

The drawings are by way of example and show the preferred means of carrying out my invention. In Figure 1 is represented in a general way a car 10 having a conventional steering wheel 11, engine manifold 12, clutch pedal 13, and connection 14 below a floor opening 15 through which the ordinary shift lever extends, but in the present instance the shift lever is removed and my apparatus substituted for it so that the member 14 is covered by a cap 16. I have also shown the conventional gear shift rods 17 which are moved endwise to shift the gears, but this is a conventional arrangement and therefore it is not necessary to show the gears, as the longitudinal movement of each rod performs this function. In order that there may be no misunderstanding, however, I have shown and shall describe a simple way of connecting the rods with a standard gear.

As a practical means of carrying my invention into effect, I employ cylinders 18 and 19, the pressure in which is controlled from a button box 20 near the steering wheel. The cylinders can be of any usual or preferred construction, and I have shown them provided with heads 21 and 22 held against the cylinder ends by bolts 22ª, but obviously the construction of the cylinders is unimportant. The cylinders should, however, be provided with a supporting plate or hanger 23 which can be attached underneath the floor 24 of the car.

The operation of the cylinder and connected parts will be referred to later, and I will now describe the button box and the means for supporting it near the steering wheel so that it can be instantly operated without necessitating the removal of the driver's hand from the wheel. The button box is shown best in Figures 9 to 14, and its support in Figures 7 and 8. While the invention is not limited to the means for supporting the box, the means is believed to be novel, and comprises an arm 25 which is clamped to the steering post just below the steering wheel, and to this end the arm (see Figures 7 and 8) is shaped at its inner end to fit the post as shown at 26, and has a detachable flange 27 with abutting parts 28 and 29 which can be secured together by screws 30, and thus the arm can be supported just below the wheel so that the button box 20 will be near the periphery of the wheel and within easy reach of the operator. The button box has a head 31 in which is formed a chamber 32 which is covered by a cover plate 33 formed on the end of the arm 25 and fitting snugly against the bottom of the head 31. The chamber 32 of the button box (see Figure 11) is connected with a source of vacuum, which might be a vacuum tank, fan, or the like, but which is preferably a manifold 12 of the engine, as shown in Figure 1, by a pipe 35 which leads in through an opening 26ª in the cover plate 33 (see Figure 12) and the pipe 35 and the other vacuum pipes hereinafter referred to, are for convenience held in a tube 37 leading from the dash of the car to the under side of the button box, as in Figure 1. Obviously this is a matter of convenience, and a different arrangement of the pipes would not affect the invention.

Sliding horizontally in the button box and within easy reach of the fingers, are buttons 38, 39, 40 and 41, representing respectively reverse, first, second and third or high speeds, and these buttons slide through openings 42 in the removable cap 42ª and connect with the slide valves 43 which move in bores or channels 45 in the head 31. The valves are normally pressed outward by springs 46 behind them (see Figure 14). At the base of the buttons 38 to 40 are grooves 44 to receive a locking plate hereinafter referred to.

Each valve 43 is provided with an internal bore or port 47 (see Figure 14) and a branch port 48 connected therewith and adapted to connect or register with the vacuum chamber 32. Each valve 43 is also channeled longitudinally in one side as shown at 49 (see Figures 15 and 17) to receive a guide pin 50 held in place by the plate 51 on the upperside of the head 31, and thus the valves are prevented from turning, and their ports 48 will register accurately with the corresponding vacuum ports in the chamber 32, and by referring to Figure 11 it will be seen that each valve connects with the vacuum chamber. The plate 51 is held in place by screws 52 or the like.

Inside the cap 42ª is a slide plate or lock plate 55 which moves transversely in the guideway 56, and has holes 57 (see Figure 13) through it for the passage of the several valves 43. This plate is normally pushed outward by the spring 58 or equivalent spring, which is shown coiled around a pipe 58ª, and the wall of each hole except the one which receives the reverse valve connected with the button 38, has an inclined edge portion 59 which is adapted to engage a triangular notch 60 in the corresponding valve 43. Thus when a button and its valve are pushed in, as shown at the left hand in Figure 14, the edge 59 of the corresponding opening through the slide plate will engage on a channel 44 of the said button, which in the present instance is 41, and lock the valve in its inward position. If now one of the other buttons and valves 39 or 40 should be pushed into effect a different shift of gears as presently described, the inclined wall of the notch 60 acting on the corresponding edge of the slide plate would push the slide plate against the tension of the spring 58 and permit the button 41 and its corresponding valve 43 to slide out to normal position.

The shank of the reverse valve 43 which is connected with the button 38, has a rectangular notch 61 therein, and the slide plate 55 has a comparatively square edge at this point so that the valve is positively locked by the slide plate, and is only released by pushing in on the button 63 at the end of the button box, which connects with the slide plate by a shank 62. Thus the reverse valve can only be used by manually releasing the slide plate, so as to make it impossible to operate the reverse valve in error.

The button box has a relief port 64 extending longitudinally through it and traversing the bores 45 behind the valves 43 while the latter are in normal or outward position, and in order that there may be quick relief and in that the air may rush in to the one side of the respective cylinder pistons when the vacuum is created on the other side, additional vents are provided as shown at 64ª and 64ᵇ in Figures 16 and 17. The ports 64ª connect with the under sides of the bores 45, and channels 64 run downward in the face of the head 31 behind the plate 51, so that it will thus be seen that ample air vents are provided for the inrush of air at desired times, as will be more fully described hereafter.

To provide for connecting the button box, and through it the cylinders, with the necessary hand controlled vacuum, ports are produced in the head 31 of the button box (see Figure 11) and these can be conveniently in the face of the head next the cover plate 33 (see Figure 16). One of these channels or ports 65 connects with the bore 45 behind the button 38 and its valve, and through a port 66 and corresponding hole 66ª on the cover plate with the pipe 67 leading to one end of the cylinder 18 (see Figure 18), and the next or first speed valve behind the button 39 connects by ports 69 and 70 and a corresponding hole 70ª through the cover plate 33 with a pipe 71 which leads to the cylinder 18 on the opposite side of the piston from the pipe 67, as shown at 72 in Figure 6. Thus one cylinder as arranged is adapted to shift either to reverse or first speed, and the other cylinder 19 is adapted to control the second and high speeds. To this end a channel 73 and port 74, together with the hole 74ª in the cover plate 33, provide for connecting with the pipe 75 which leads to one end of the cylinder 19, while by means of the channel 76, port 77, and hole 77ª, a pipe 78 leads from behind the valve of the button 41 to the cylinder 19 on the opposite side of the piston from the pipe 75. The manner in which these valves control the operations of the pistons and the shifting of the gears, will be described in detail in describing the operation of the apparatus as a whole.

Each cylinder 18 and 19 is provided with a suitable piston 79 (see Figure 6) and with a piston rod 80 which extends through both ends of the cylinder, and on one end, the front end as shown, the piston rod is provided with a collar 81 which is made in the form of a spider to provide space for the bolts 86 presently referred to, and this collar connects by bolts 82 with a second sliding collar 83 which slides on the piston rod 80, and spaced apart from the collar 83 between it and the collar 81, is a collar 85, and the collars 85 and 83 are normally separated by a compression spiral spring 84. The collar 85 receives supporting and guide bolts 86 which lie in slots 87 in the collars 83 and 85, and the outward movement of the collar 85 is limited by nuts on the outer ends of the bolts 86. The collar 85 also has holes 88 therethrough to receive and guide the bolts or rods 82. The bolts 86 are fast to the corresponding cylinder head 22, and it will be seen that when the piston is moved toward the cylinder head 22 as in Figure 6, it will be against the tension of the spring 84, as the collar 81 will be carried outward and the collar 83 will move with it and compress the spring against the collar 85. If, however, the piston is moved towards the opposite end of the cylinder, the collar 81 will strike the collar 85, and move this inward against the pressure of the spring 84, and the necessary resistance will be afforded by the collar 83 which will abut with the cylinder head. Thus the single spring 84 acts as a resisting member when the piston 79 is moved in either direction, and will assist in centering the piston and returning it to its normal or neutral position, which is central of the cylinders.

As shown best in Figures 2 to 6, the following mechanism is used to connect with the gear shift rods 17. Each piston rod 80 is at one end, the rear end in the present instance, provided with an ear 89 which pivotally connects by a short link 90 with a lever 91, which at its lower end is pivoted as shown at 92 to the bracket arm 93, the latter being fast on the head 21 of the corresponding cylinder. Projecting transversely of the lever 91 is a stud 94 which serves also as a connection with the gear shifting rod 17, which as stated can operate any standard gear shift, but which can have a special connection as shown in Figures 23 and 24, and hereinafter referred to. The stud 94 also serves as a convenient medium for engaging the notches 95 of a locking pawl 96, thus locking the piston except when the latter is released by the clutch pedal as presently described.

The pawl 96 is carried by a rock shaft 97 which is mounted on brackets 93, and it is normally pulled down into engagement with the stud 94 by a spring 98. The shaft 97 has a crank 99 connecting by a rod 100 with the clutch lever 13, so that by moving the lever, the rod 99 can be rocked and the pawl 96 released.

In Figures 4 and 4ᵃ I have shown a positive lock which is automatic, and which will lock one of the piston rods positively while the other one is in use, and which permits either piston to be operated at will only when the pistons are at neutral position, that is are in position to throw the gears to neutral. To this end the piston rods 80 are each provided with corresponding circumferential grooves 102, which receive balls 103 contained in the casings 101, and the casings also serve to support the drift shaft 104 which is simply a turnbuckle adjustable as to length, and which bears against the two balls, as shown in Figure 4ᵃ. When the pistons are at neutral position, the balls will be opposite the grooves 102, and there is sufficient play for either piston and its rod 80 to operate, but as soon as one piston moves, its piston rod will also move lengthwise, and the corresponding ball 103 will be forced out of its channel 102, the ball riding on the surface of the piston rod 80, and thus the drift rod or turnbuckle 104 will be moved outward sufficiently to force the ball 103 firmly into the channel 102 of the opposite piston rod, and this latter will obviously be locked immovably. This is an important feature, and it will be seen that when one piston is operated to shift a gear, the other will be securely locked so that if the driver under excitement or confusion should try to start another piston, it could not possibly be done until the pistons are first brought back to neutral position.

While the rods 17 can connect in many ways with the shifting mechanism of a transmission, as will be understood, I have shown in Figures 23 and 24 the way of connecting with a common form of transmission. As here shown, the gear case 105 has the engine shaft 106 entering it and connecting in the usual way with the main shaft 107. This carries a gear 108 meshing with and constantly driving the gear 109 on the countershaft 110. On this shaft is a fixed gear 111 for second speed, and this is adapted to connect with the shaft or sliding gear 112 on the main shaft, which has an extension 113 provided with internal teeth to engage the high gear 114 forming an extension of the gear 108. The gear 113 is keyed to the shaft 107, and is operated by a fork 115 sliding on a supporting shaft 116. The countershaft 110 also carries the reverse and low gears 117 and 118 which are adapted to be engaged by the sliding gear 119 which is moved by the fork 120, which is supported on a shaft 121. The rods 17 to which I have previously referred, have extensions 17ᵃ and 17ᵇ extending into the removable cap 122 of the case 105, and sliding in bearings 123 and 124 in the cap. The extensions 17ᵃ and 17ᵇ carry lugs 125 and 126 which are adjustable thereon, and which engage the forks 115 and 120 respectively, so that by moving one rod 17 and its extension 17ᵃ, the second and high gears are controlled, and the other rod controls the reverse and low.

The operation of the apparatus is as follows. Normally the gears will be at neutral and the pistons 79, in the cylinders 18 and 19 will be central of the cylinders as shown in Figure 18, and the pawl or latch 96 will be in the position shown in Figure 6 with the corresponding pistons locked by reason of the engagement of the latch with the stud 94. The locking bars 103 will, however, be in the position shown in Figure 4ᵃ to permit either piston to move. If now it is desired to reverse and back the car, the driver pushes in on the button 62, thus releasing the button 38, which is pushed in and carries with it the reverse valve 43. This opens the vacuum to the reverse end of the cylinder 18, the suction being from the manifold 12 through the pipe 67, the chamber 32 of the button box, the port 48 of said box, the bore 47 of the valve 43, the channel 65, port 66 and pipe 67, to the cylinder 18. If now, the clutch pedal 13 is moved, it lifts the pawl or latch 96 and the piston 79 moves to the position shown in Figures 19 and 6 against the tension of the spring 84, and the rod 17 will be actuated so as to move the extension 17ᵇ (see Figures 23 and 24) and shift the gear 119 into engagement with the gear 117, thereby throwing the gear to reverse position, and if the clutch pedal is released, the latch 96 falls back and locks the piston in this position. If, now, it is desired to shift to first speed, the operator presses inward on the button 39, and this moves the lock plate 55 (see Figure 14) so as to release the button 38 and its valve 43, and the latter immediately springs out. As it does so it allows the air to rush into the front end of the cylinder 18 through the ports 64, 64ᵃ and 64ᵇ, the bore 45, and the pipe 67. At the same time the valve of the button 39 will have moved inward and be locked in place by the lock plate 55, thus opening the vacuum to the desired end of the cylinder 18, but the piston 79 will not move until the clutch pedal 13 is actuated so as to lift the latch or pawl 96 and release the piston, at which time the latter will move smoothly to the opposite end of the cylinder shown in Figure 6, and against the pressure of the spring 84, thus actuating the rod 17 and extension 17ᵇ so as to shift the gear 119 (see Figure 23) into engagement with the gear 118. The movement of the piston to its new position is shown in Figure 20.

If, now, it is desired to shift to second position, shown diagrammatically in Figure 21, the operator presses the button 40, and this releases the button 39 which flies out, and the button 40 is locked in its inner position, as already described, opening the ports from the exhaust through the button box and pipe 75 to one end of the cylinder 19, and if the clutch lever is pressed and the piston unlocked, the latter moves to the position shown in Figure 21, thus operating the piston rod and the extension 17ᵃ of the rod 17, so as to shift the gear 113 (see Figure 23) into engagement with the gear 111. Likewise if it is desired to shift to high, the button 41 is moved, releasing the button 40 and opening the vacuum in the manner already described from the manifold or source to the opposite end of the cylinder 19, and if the clutch lever is released, the piston moves so as to actuate the piston rod, rod 17, and extension 17ᵇ, to shift the gear 113 into engagement with the gear 114.

From the foregoing description of the operation it will be seen that there is no chance for accident resulting from mistake or confusion, because the pistons 79 which do the work are automatically locked by the latch 96, and the piston of the cylinder which is not in use is positively and automatically locked by the ball lock shown in Figure 4ᵃ. It will be further noticed that when a button is pressed in, it places the valves in position to admit the vacuum to the desired part of a desired cylinder, and it also releases the vacuum from the opposite side of the piston so that the latter may act quickly, but no action takes place until the clutch pedal is operated to release the desired piston. Thus it follows that one can press the button to open the vacuum to the desired cylinder and a desired end thereof, some time before he wishes to make the change, and then when the point is reached where he wishes to shift, all he has to do is to press the clutch lever, and the shifting takes place quietly but instantly, and there is no danger of stripping gears, because the pressure behind the piston doing the work is a cushion, and the gear shifts into engagement very quietly at the first moment that the gears register.

From the foregoing description it will be seen that I have designed a structure which is positive and quiet in operation, and is very easy to operate, besides being safer than the ordinary shifting arrangements. It will be noticed that by having the controlling buttons placed within easy reach of the operator, that is, adjacent to the steering wheel, he can without releasing his hold on the wheel shift the transmissions as desired, and do this with safety and without excitement, because nothing takes place until he has moved his clutch pedal, and it will be noticed further how absolutely the apparatus is safeguarded. First the pushing in of a button on the button box releases the other buttons and locks the button pushed in; next, the piston which is to operate is locked automatically so that it cannot move until the clutch pedal is operated to release it, and further, the two operating pistons cannot possibly under any circumstance move at the same time, by reason of the ball lock which holds one piston and its piston rod positively against movement while the other is in any position except neutral. It will be further seen that when the buttons are all in normal position, the pistons and the connecting transmissions are at neutral, and that the gears cannot be shifted at all except when the car is running.

I claim:—

1. In a gear shifting apparatus, a plurality of cylinders, pistons for the cylinders, said pistons having projecting piston rods, a connection between the piston rods and gear shifting rods, a stud connected with the aforesaid rods, a rock shaft, a pawl or latch carried by the shaft and engaging the aforesaid stud, and means for rocking the shaft to release the pawls and the pistons connected therewith.

2. In an apparatus such as described, a cylinder, a piston therein having a piston rod projecting from the ends of the cylinder and one end of the piston rod adapted to connect with a gear shift rod, a fixed collar at the opposite end of the piston rod, a second collar sliding on the piston rod between the cylinder head and the first collar, means for holding the first and second collars in spaced relation, a third collar sliding on the piston rod between the two aforesaid collars and having means for limiting its outward movement with relation to the cylinder head, and a compression spring between the second and third collars.

3. In a gear shifting apparatus, a cylinder, a piston movable therein and having a piston rod projecting from opposite ends of the cylinder, one end of the piston rod connecting with gear shifting apparatus, and a single spring arranged on the opposite end portion of the piston rod and constructed to act as a tension against the movement of the piston and to center the piston after its movement in either direction.

4. In a gear shifting apparatus, a plurality of cylinders arranged side by side in parallel relation, pistons movable in said cylinders, a single spring for each piston, means actuated by said springs for holding said pistons in central or neutral positions in said cylinders and means for locking said pistons in other than neutral or central positions, said means comprising a detent acting automatically to lock the pistons and connected parts in operative positions, and manually operated means for releasing the detent.

5. In a gear shifting apparatus, a plurality of cylinders arranged side by side in parallel relation, pistons movable in said cylinders provided with projecting piston rods, springs surrounding said projecting piston rods for maintaining the said pistons in inoperative positions in said cylinders and means for locking said pistons in operative positions, said means comprising levers pivoted to the piston rods and to an adjacent support, said levers being adapted to operate the gear shifting rod, a detent for locking the levers in predetermined positions, and manually operated means for releasing the detents.

6. In a gear shifting apparatus, a plurality of cylinders arranged side by side in parallel relation, pistons movable in said cylinders and provided with projecting piston rods, resilient means bearing against said projecting piston rods for maintaining said pistons in a central position in said cylinders and manually controlled locking means for maintaining said pistons in operative positions, said means comprising levers pivoted to the piston rods and to an adjacent support, said levers being adapted to operate the gear shifting rod, a detent for locking the levers in predetermined positions, and manually operated means for releasing the detents.

7. In a gear shifting apparatus, a plurality of cylinders arranged side by side in parallel relation, pistons movable in said cylinders, means for maintaining said pistons in central or neutral positions in said cylinders, and means for locking said pistons in other than central or neutral positions, said means comprising a lever pivoted to a support and each piston rod, a manually operated rock shaft and a detent on the rock shaft engaging a complementary part on the lever when the piston is in operative position.

ALVIN M. CRAIG.